United States Patent [19]

Seedhouse

[11] 4,386,843
[45] Jun. 7, 1983

[54] SCANNING SYSTEM FOR DOCUMENT REPRODUCTION DEVICE

[75] Inventor: Frederick A. Seedhouse, Webster, N.Y.

[73] Assignee: Xerox Corporation, Stamford, Conn.

[21] Appl. No.: 273,793

[22] Filed: Jun. 15, 1981

[51] Int. Cl.³ .................... G03G 15/04; G03G 15/28
[52] U.S. Cl. .......................................... 355/8; 355/11; 355/51; 355/57
[58] Field of Search ..................... 355/3 R, 8, 11, 51, 355/57, 49

[56] References Cited

U.S. PATENT DOCUMENTS

| | | | |
|---|---|---|---|
| 3,454,335 | 7/1969 | Caldwell et al. | 355/8 |
| 3,709,602 | 1/1973 | Satomi | 355/11 X |
| 4,232,960 | 11/1980 | Glab | 355/8 |
| 4,293,184 | 10/1981 | Minoura et al. | 355/8 X |

Primary Examiner—Fred L. Braun

[57] ABSTRACT

An optical system for scanning a document in an object plane includes a pivoting mirror and a projection lens which projects an image onto the surface of a photoreceptor. By rotating and translating the projection lens while simultaneously moving an aperture slit in a direction of movement opposite to the movement of the photoreceptor, a condition is constantly maintained wherein the object plane, lens plane and image plane are maintained parallel thereby eliminating field tilt. With this configuration, the image is also precessed onto the photoreceptor providing a precession distance which can be used to relax constraints normally imposed by scan return conditions. In a specific embodiment, a double reflector arrangement on the image side of the projection lens is used to maintain total system conjugate.

3 Claims, 1 Drawing Figure

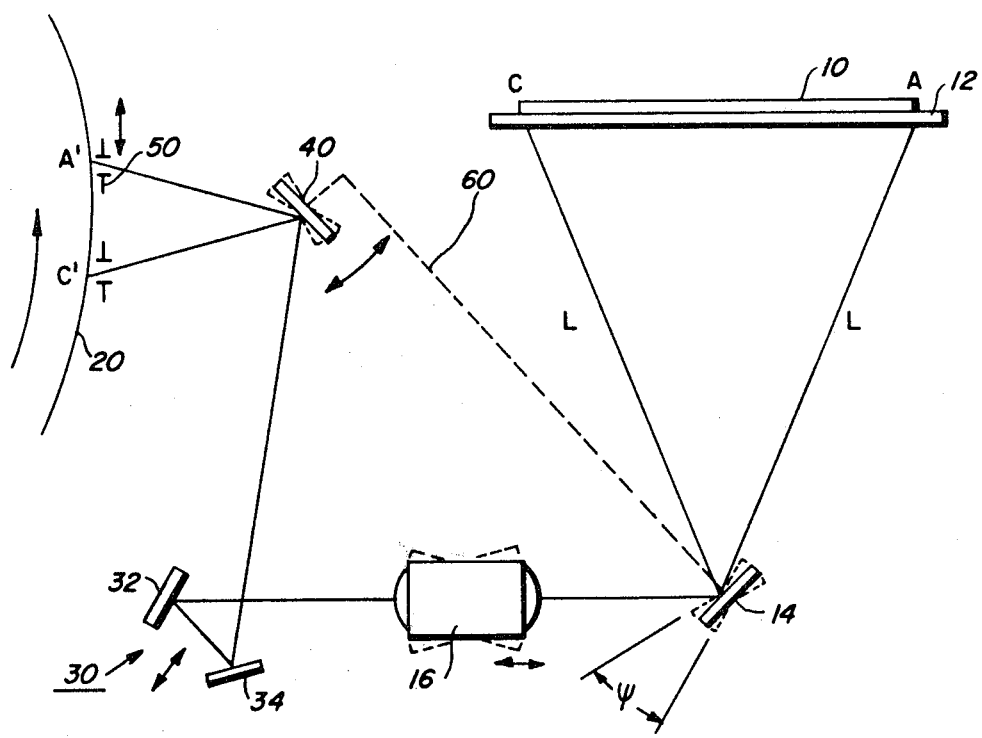

SCANNING SYSTEM FOR DOCUMENT REPRODUCTION DEVICE

BACKGROUND AND PRIOR ART STATEMENT

This invention relates generally to a document reproduction device and, more particularly to an optical system which scans a document lying on an object plane by means of a pivoting mirror, and projects the reflected and document image onto a photosensitive surface.

Reproduction devices which utilize a fixed light source and pivoting mirror to scan a document on a curved platen are known in the art, e.g. the Xerox 2400 and 3600 machines. It is desirable to copy documents by placing them on a flat platen while retaining the scanning simplicity of a pivoting mirror arrangement. However, this has heretofore not been possible due to the basic problem of compensating for the "field tilt". Field tilt is the deviation of the image plane from parallelism to the ideal photoreceptor during scan. With use of a flat platen, a keystoning distortion effect also occurs because points on the image plane will vary in focus because of non-uniform magnification ratio or change in the ratio of the object and image conjugate distances during scan.

In one aspect of the present invention, there is provided an optical system which scans a document on a flat platen by means of a pivoting mirror and projects an image of said document onto a photoreceptor surface, the imaging being accomplished without the attendent problems of field tilt or keystoning distortion.

According to another feature of the invention, the scanned image is projected onto a moving photoreceptor at a rate faster than the rate of movement of the photoreceptor and in the direction opposite such movement. This technique, which can be termed as precessing the image, is generally known in the art. U.S. Pat. No. 3,454,335 (Caldwell) assigned to the same assignee as the present invention, discloses a method of projecting images on microfilm cards which are moved past a stationary lens and mirror system onto a drum photoreceptor. The drum and microfilm are moved at the same speed but the image is precessed (i.e. moved in a direction opposite the drum motion) onto the drum surface by means of a slit aperture. This combined slit and drum rotation exposes the drum at a speed (rate) that is greater than the surface speed of the drum. This scanning system demonstrates two of the advantages gained by image precession: the process speed of the system can be set at a lower speed for equivalent copy rate (copies per minute) and the gap ordinarily present between images (due to the return time of the scan optics) can be reduced or eliminated if desired. Scan return velocities for a given copy rate can also be minimized for a given copy rate thus reducing scan accelerations, forces and vibrations. A problem with such a system, however, is that defocusing errors may result in developed images unacceptable for some systems. The errors are introduced because the image reflected from the drum mirror to the slit does not maintain perpendicularity to a tangential line at the drum surface.

This defocusing problem is addressed in U.S. Pat. No. 4,232,960 (Glab) assigned to the same assignee as the present invention. Glab solves the problem of field tilt in his particular scan system, by using linear and rotational motions of optical elements located near a drum surface to scan the image onto a photoreceptor drum at the angle corresponding to the angle of reflection of the image from the platen.

Another prior art device which utilizes precession onto a drum photoreceptor is disclosed in U.S. Pat. No. 3,650,621 (Lewis) also assigned to the same assignee as the present invention. Lewis discloses a system wherein an imaging device is moved in an arcuate path which is in a direction opposite to drum rotation to scan document on a curved platen onto the drum.

Another optical system for precessing an image onto a drum type photorecptor is disclosed in copending U.S. Application Ser. No. 190,110, filed on Sept. 24, 1980 and assigned to the same assignee as the present application. In this copending application a dual rate scanning mirror is driven at a speed greater then the process speed of the drum photoreceptor. A drum reflector is adapted to reflect the image onto the drum surface in a direction opposite the drum rotation.

The present invention is directed to a scanning system which scans a document on a flat platen with a pivoting mirror arrangement while simultaneously precessing an image onto a photosensitive surface without attendent defocusing problems. The invention is realized in a system which includes a projection lens having a rotational and translational motion, a pivoting mirror for scanning said object and reflecting said light image towards said projection lens, an aperture slit located adjacent the photoreceptor surface, the aperture plate moving in a direction opposite the direction of movement of the photoreceptor means for maintaining constant conjugate during scan, said means including a translatable mirror assembly which reflects an image projected from the lens onto a rotatable mirror opposite the photosensitive surface; said rotatable mirror synchronized with the movement of said aperture plate so as to reflect the images received from said mirror assembly through said aperture onto the photosensitive surface, and means for synchronizing the motions of said lens, mirror and aperture slit so as to maintain parallel object, lens and image planes during the entire scan cycle, whereby said lens rotates simultaneously with said reflector and slit motion to continually maintain said projected image at the photosensitive surface at the same angle of incidence as the angle of the principal scanning ray of the object plane.

The concept of rotating and translating the projection lens in conjunction with the pivoting motion of a scan mirror to maintain a projected image at a curved photoreceptor at the same angle of incidence as the angle of the principle scanning ray is disclosed in copending application Ser. No. 269,522 filed on June 1, 1981, now U.S. Pat. No. 4,367,034 assigned to the same assignee as the present invention. In said copending application the total conjugate was changed by said movements and compensation was achieved by introducing a second translatable mirror between the pivoting scan mirrors and the platen. The present invention provides compensation for conjugate change by introducing a translatable corner mirror into the optical path between the projection lens and the photoreceptor surface and can be utilized with either a curved or flat photoreceptor surface.

DRAWING

This FIGURE illustrates, in schematic form, one embodiment of a scanning system according to the present invention.

Referring to the figure, there is shown a scanning system which accomplishes a field-tilt-free scan of a document on a flat platen. A document 10, lying on platen 12, is scanned by pivoting mirror 14. An illumination source, not shown, illuminates the underside of the platen. A rotatable, translatable lens 16 provides the scanned image onto photoreceptor drum surface 20 (shown in partial view) via a reflection from a translatable corner mirror arrangement 30, a rotating drum reflector 40 and through a moving aperture slit 50.

In operation, mirror 14 rotates through some angle $\psi$ so as to scan the document 10 from object point A to object point C. To compensate for the effects of field tilt caused by the vertical scanned images moving out of the object plane, lens 16 is rotated on angle $2\psi$ on or about one of its nodal points while simultaneously translating along the optical axis. Mirror 40 rotates and reflects the projected image through slit 50 moving in the direction opposite to surface's 20 motion to precess the image from point A' to point C'. The effect of these movements is to maintain the object plane, lens plane and image plane in a parallel relationship during the entire scan excursion. As the document is scanned from point A to point C, the object-to-lens distance is also changing to compensate for an axial path length change. Mirror arrangement 30, consisting of mirrors 32, 34 translate so as to compensate for this change in image path length (in conjunction with translation of lens 16). In a preferred embodiment, mirror 32, 34 would form a 90° optical square and would move at a 45° angle to the optical path, i.e, would bisect the optical path and reorient its direction by 90°. In a preferred embodiment, the motion of mirror 40 would be slaved to that of mirror 14 by mechanical linkage 60. It is noted that the path of the principal ray between mirrors 14 and 32 remain essentially fixed but there may be a slight displacement between lens 16 and mirror 32 due to nodal point separation in the lens.

While the invention has been described in the context of a preferred embodiment, other modifications are possible consistent with the spirit of the invention. For example, the drum photoreceptor can be replaced by a flat photoreceptor. Instead of a mechanical linkage between mirrors 14 and 40, an electrical servo system may be utilized. Further, the system can be adapted to operate in a magnification mode by appropriate translation of lens 16 and the mirror arrangement 30.

What is claimed is:

1. A scanning system for projecting light images of a stationary object along an optical path onto a photosensitive surface comprising:

an object plane for supporting an object to be copied;
   a projection lens having a rotational and translational motion;
   a pivoting mirror for scanning said object and reflecting said light image towards said projection lens,
   an aperture slit located adjacent said photoreceptor surface, the aperture slit moving in a direction opposite the direction of movement of said surface;
   means for maintaining constant conjugate during scan; said means including a translatable mirror assembly movable along a translation path which reflects an image projected from the lens onto a rotatable mirror opposite the photosensitive surface; said rotatable mirror motion synchronized with the movement of said aperture slit so as to reflect the images received from said mirror assembly through said aperture onto the photosensitive surface so as to maintain parallel object, lens and image planes during the entire scan cycle;
   whereby said lens rotates simultaneously with said reflector and slit motion to continually maintain said projected image at the photosensitive surface at the same angle of incidence as the angle of the principal scanning ray at the object plane.

2. The scanning system of claim 1 wherein said mirror assembly forms a 90° optical square and said translation path moves at an angle of 45° with respect to said optical path.

3. The scanning system of claim 1 wherein said photosensitive surface is curved.

* * * * *